United States Patent [19]
Eskandari

[11] Patent Number: 6,108,116
[45] Date of Patent: Aug. 22, 2000

[54] HIGH PRECISION COLLIMATING SYSTEM

[75] Inventor: Joseph Eskandari, Monmouth, Oreg.

[73] Assignee: Xerox Corporation, Stamford, Conn.

[21] Appl. No.: 09/301,862

[22] Filed: Apr. 29, 1999

[51] Int. Cl.$^7$ .............................. G02B 26/08; G02B 27/30
[52] U.S. Cl. ......................... 359/216; 359/212; 359/641
[58] Field of Search .................................... 359/209, 210, 359/641, 212, 216–219

[56] References Cited

U.S. PATENT DOCUMENTS 5,241,174  8/1993  Ando ........................................ 250/235
5,432,537  7/1995  Imakawa et al. ........................ 347/133

*Primary Examiner*—James Phan
*Attorney, Agent, or Firm*—Fariba Rad

[57] ABSTRACT

A collimating system utilizes a Rainbow® disk for holding and adjusting the position of the collimating lens. By applying a voltage to the two surfaces of the Rainbow® disk, the disk changes shape which causes the position of the collimating lens to be displaced. By adjusting the amount of voltage applied to the disk, the position of the collimating lens can be precisely adjusted to provide a substantially collimating light beam.

6 Claims, 6 Drawing Sheets

HIGH PRECISION COLLIMATING SYSTEM

BACKGROUND OF THE INVENTION

This Application is related to automatic adjustment of collimating lens of a raster scanning system and more particularly to a raster scanning system which utilizes a collimating lens mounted on a dome shaped ceramic piezo-electric servo. The piezo electric servo automatically adjusts the distance between the laser diode and the collimating lens of the printing system to assure the light beam exiting the collimating lens is collimated.

Referring to FIG. 1, there is shown a tangential (fast-scan) view of the raster output scanner 10 of a printing system. The raster scanning system 10 utilizes a laser light source 12, a collimating lens 14, pre-polygon optics 16, a multi-faceted rotating polygon mirror 18 as the scanning element, post polygon optics 20 and a photosensitive medium 22.

The laser light source 12 sends a light beam 24 to the rotating polygon mirror 18 through the collimating lens 14 and the pre-polygon optics 16. The collimating lens 14 collimates the light beam 24 and the pre-polygon optics 16 focuses the light beam 24 in the sagittal or cross-scan plane onto the rotating polygon mirror 18. The facets 26 of the rotating polygon mirror 18 reflect the light beam 24 and also cause the reflected light beam 24 to revolve about an axis near the reflection point of the facet 26. The reflected light beam 24 can be utilized through the post polygon optics 20 to scan a document at the input end of an imaging system as a raster input scanner or can be used to impinge upon a photographic film or a photosensitive medium 22, such as a xerographic drum (photoreceptor), at the output of the imaging system.

The distance d between the laser light source 12 and the collimating lens 14 is critical to the quality of print. If for any reason such as thermal expansion of the fixtures, the distance between the laser light source 12 and the collimating lens 14 changes, the light beam existing the collimating lens 14 will not be collimated. This in turn causes the light beam 24 striking the photoreceptor 22 to be out of focus which would degrade the quality of the latent image.

Referring to FIG. 2, a traditional approach to resolve this problem is to mount the laser light source 30 on a fixture 32 and mount the collimating lens 34 on a second fixture 36. The two fixtures 32 and 36 are attached to each other via a fixture 37 which is attached to the housing 38 of the raster scanning system. The material and the length of fixture 32 are different than those of fixture 36. The difference in length and the material of the two fixtures 32 and 36 are selected to keep the distance $d_1$ fixed. The combination of the expansion coefficients of the two materials with the difference in lengths will cause the two fixtures 32 and 36 to expand at the same rate.

However, this approach does not provide an accurate adjustment. Due to the impurities within the metals and the fabrication method, metals usually do not have a precise coefficient of expansion. Typically for each metal, the coefficient of expansion has a range where the user usually uses the average. Therefore, the inconsistencies in the coefficients of expansion of the two materials may cause significant errors in the above approach.

It is an object of this invention to provide a servo which is capable of automatically adjusting the distance between a light source and a collimating lens of a printing system when the light exiting the collimating lens looses its collimation.

SUMMARY OF THE INVENTION

According to the present invention, a collimating system utilizes a light source, a collimating lens and a Rainbow® disk to hold the collimating lens. Once a voltage is applied to the two surfaces of the Rainbow® disk, it changes shape which causes to displace the position of the collimating lens. This is used to adjust the position of the collimating lens to provide a substantially collimated light beam.

According to another aspect of the present invention, a raster scanning system utilizes a light source, a collimating lens, a medium, and a scanning means to scan the light beam from the collimating lens across the medium. In addition, the scanning system includes a Rainbow® disk to hold the collimating lens. Once a voltage is applied to the two surfaces of the Rainbow® disk, it changes shape which causes to displace the position of the collimating lens. This is used to adjust the position of the collimating lens to provide a substantially collimated light beam.

DESCRIPTION OF THE PREFERRED EMBODIMENT

Figure 1:
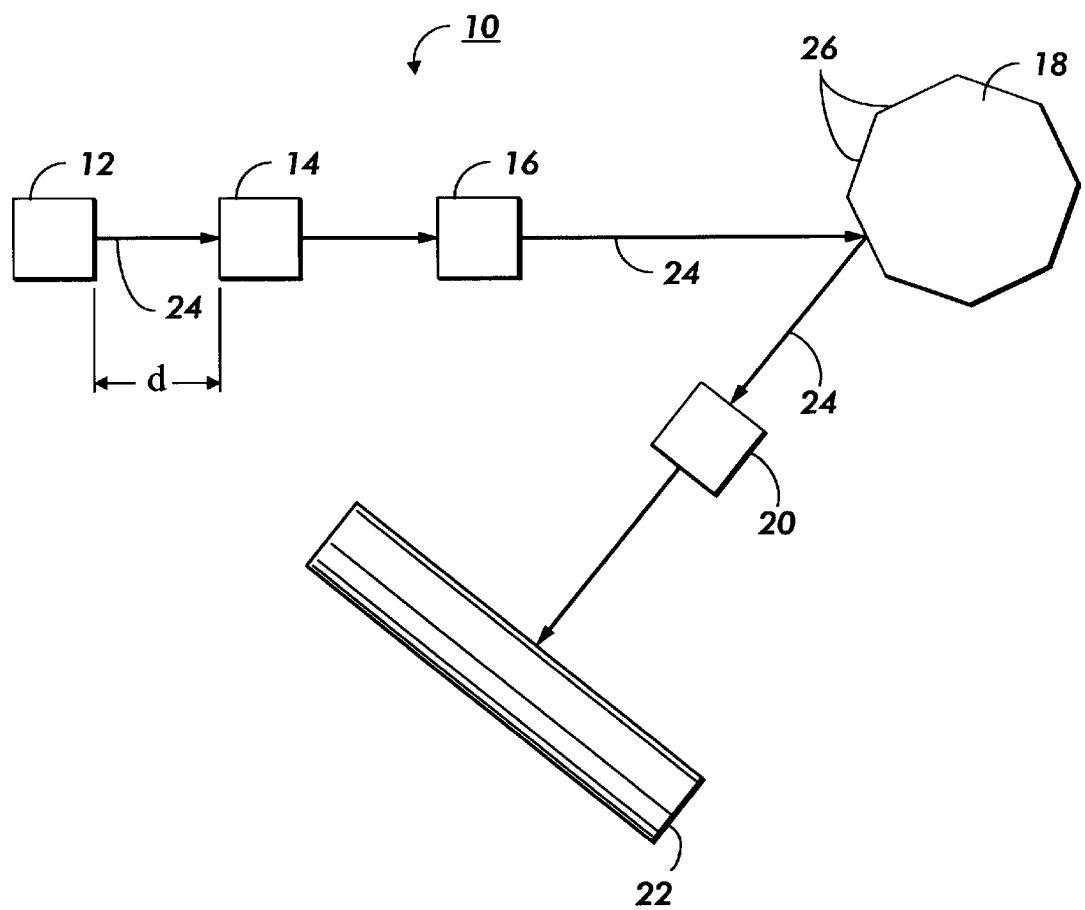
FIG. 1 shows a tangential (fast-scan) view of the raster output scanner of a prior art printing system.
Figure 2:
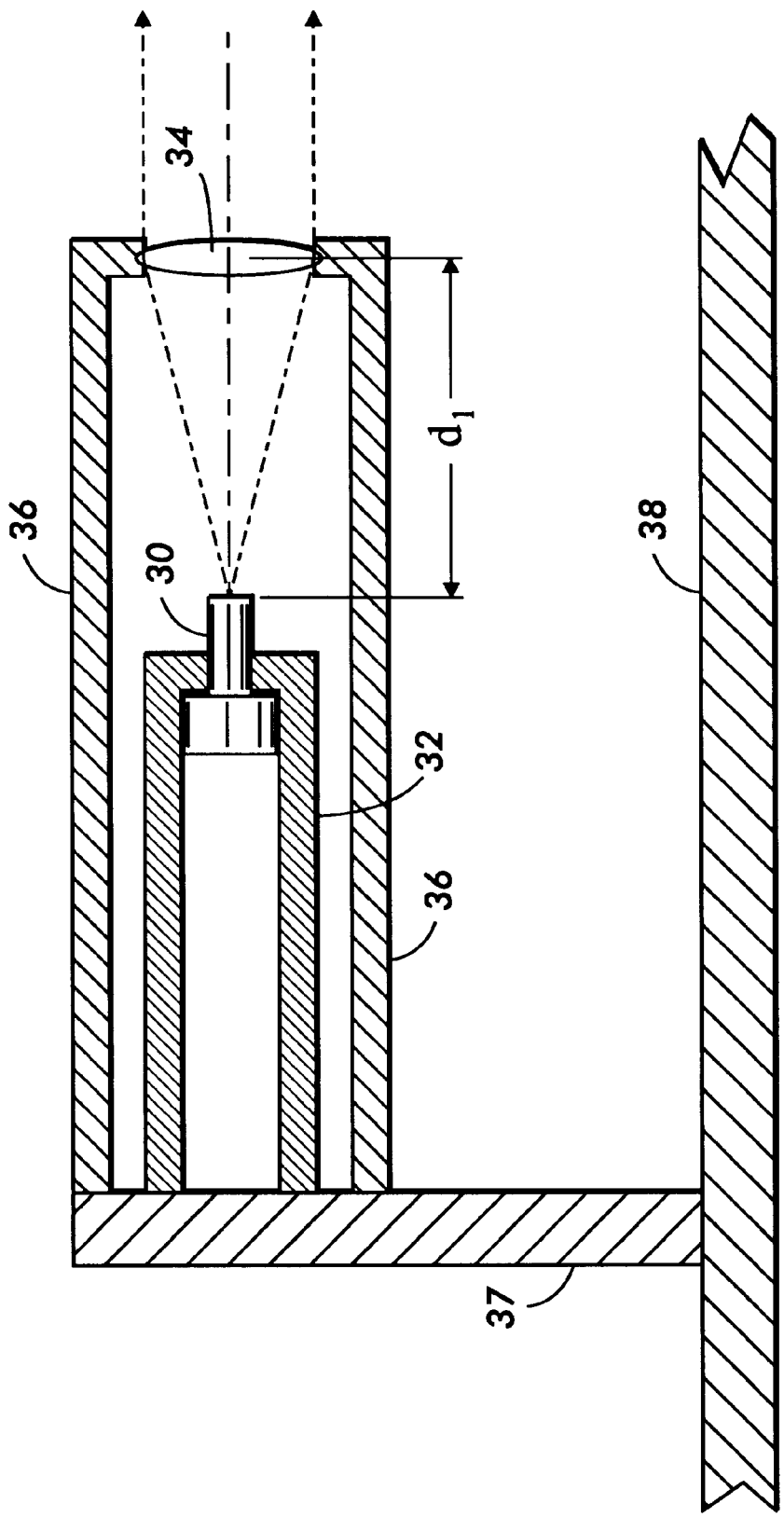
FIG. 2 showa one prior art approach to resolve the loss of collimation due to various reasons such as temperature change.
Figure 3:
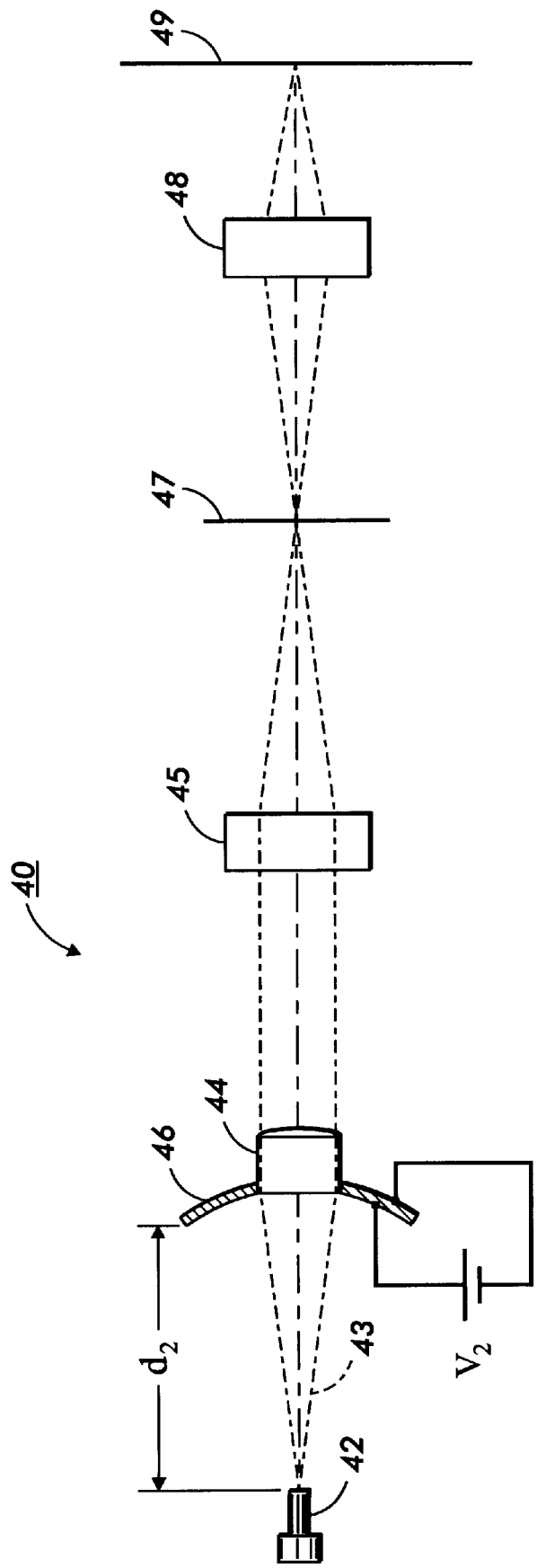
FIG. 3 shows raster scanner of this invention.

Referring to FIG. 3, there is shown a raster scanner 40 of this invention which comprises a laser light source 42, a collimating lens 44 mounted on a piezo-electric disk 46, pre-polygon optics 45, a multi-faceted rotating polygon mirror 47, post polygon optics 48 and a photoreceptor 49. In FIG. 3, for the purpose of simplicity, the rotating polygon mirror 47 is shown as line 47 and the light beam 43 reflected by the rotating polygon mirror 47 is unfolded. In this invention, the piezo-electric disk 46 is used to move the location of the collimating lens 44.

Figure 4:
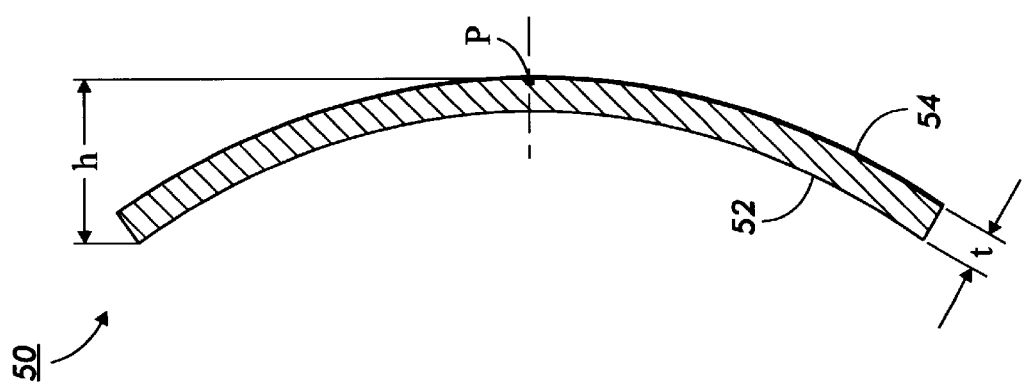
FIG. 4 shows a magnified view of a Rainbow® ceramic disk.

Piezo-electric devices are well known in the industry. However, the piezo-electric disk 46 utilized in FIG. 3 has certain features which needs to be studied. Referring to FIG. 4, there is shown a magnified view of a piezoelectric disk 50. The piezo-electric disk 50, which is a ceramic disk, is a product by the name of Rainbow® from "Aura Ceramics" company. The Rainbow® disk 50 is a disk with a thickness t in the order of 15 mils. The two surfaces 52 and 54 of the Rainbow® disk 50 are etched to have a dome shape to create different surface tensions on each surface. The Rainbow® disk 50 has a dome shape with a peak P at height h in its relaxed mode (when no voltage is applied to the disk).

Figure 5:
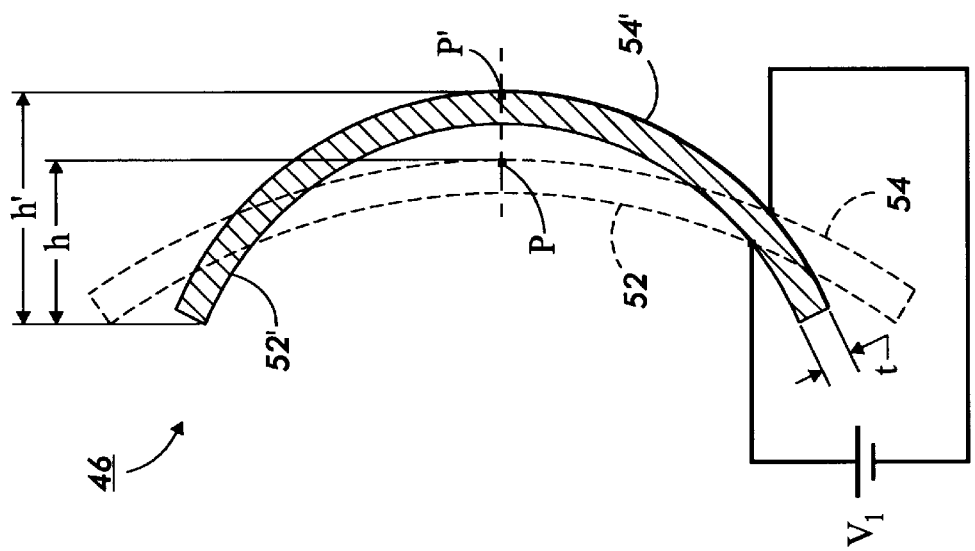
FIG. 5 shows the curvature change of the Rainbow® disk of FIG. 4 due to an applied voltage.

Referring to FIG. 5, when a positive voltage such as $V_1$ is applied to the two surfaces 52 and 54, surface 52 contracts (shown as surface 52') and surface 54 expands (shown as surface 54'). This in turn causes the curvature of the Rainbow® disk 50 to change, its peak P to move to P', and the height of the peak P to increase from h to h'. Depending on the amount of voltage $V_1$ applied to the two surfaces 52' and 54', the peak of the Rainbow® disk 50 will be displaced to a different point.

It should be noted that by applying a negative voltage, the height h of the peak P of the Rainbow® disk 50 will decrease. Therefore, by applying voltages in the range from negative to positive with voltage differences of under 200 volts, large displacement of the peak in the order of tens of microns can be achieved.

Figure 7:
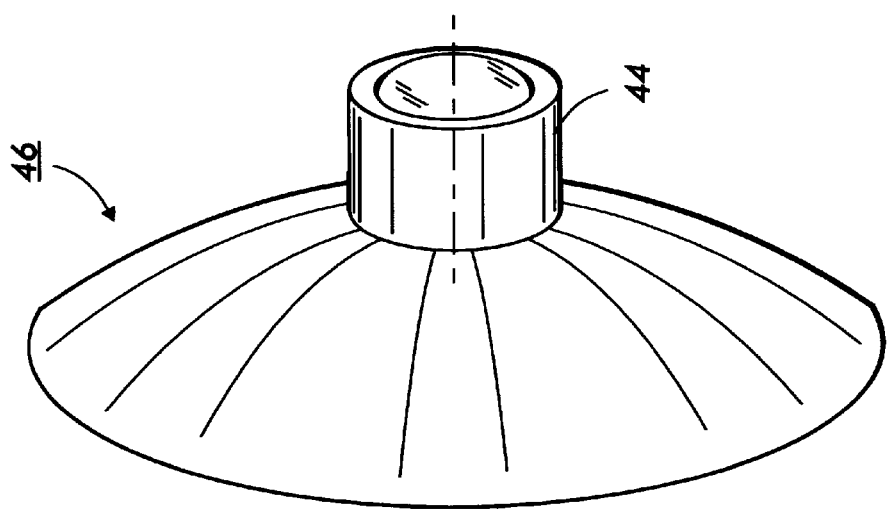
FIG. 7 shows a collimating lens which is mounted within the hole of the Rainbow® disk of FIG. 6.
Figure 6:
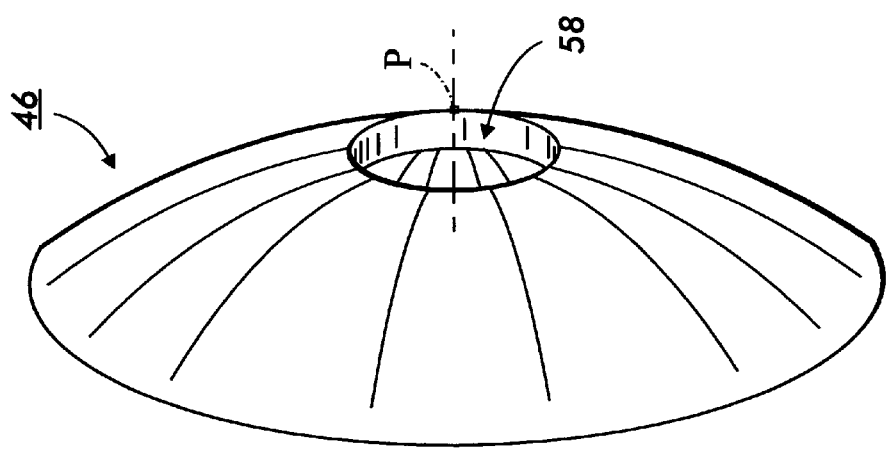
FIG. 6 shows the Rainbow® disk of FIG. 5 modified to have a hole at its peak P.

In this invention, the large displacement of the Rainbow® disk 50 is utilized for adjustment purposes. Referring to FIG. 6, there is shown a Rainbow® disk 46 of FIG. 3, which is the Rainbow® disk 50 of FIG. 5 modified to have a hole 58 at the peak P. Referring to FIG. 7, a collimating lens 44 is mounted within the hole 58 of the Rainbow® disk 46 of FIG. 6.

Referring back to FIG. 3, the ceramic disk 46 is placed in such a manner that when it is in its relaxed mode (no voltage applied), the distance $d_2$ between the collimating lens 44 and the laser diode 42 is equal to the focal length of the collimating lens 44. In other words, at the relaxed mode of the Rainbow® disk 46, the laser diode is at the focal point of the collimating lens 44.

It should be noted that if one desires, to achieve maximum displacement for the collimating lens, the laser diode can be placed at the focal point of the collimating lens 44 when a negative or positive voltage is applied to the ceramic disk 46.

Figure 8:
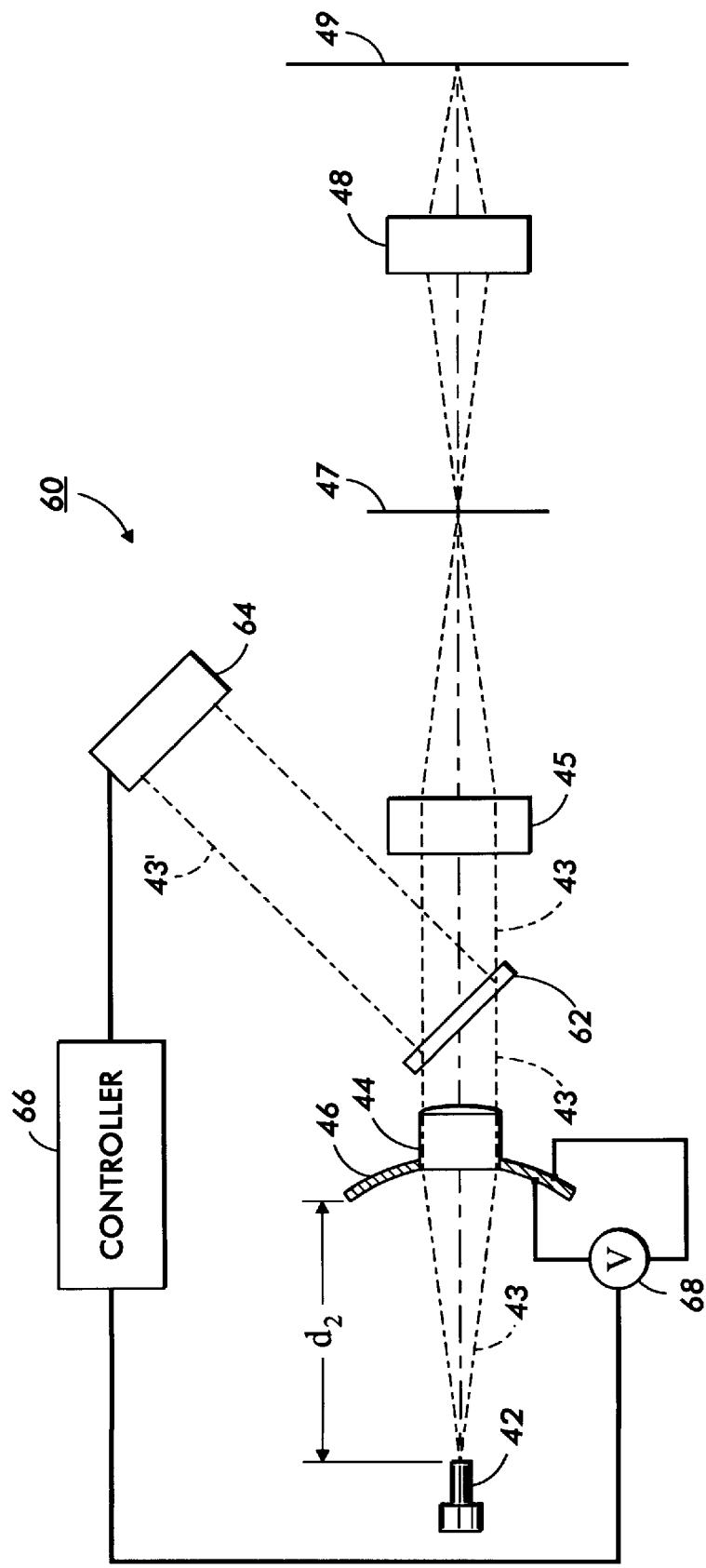
FIG. 8 shows FIG. 3 with an addition of feedback system as a servo.

Referring to FIG. 8, there is shown FIG. 3 with a closed loop feedback system 60. Addition of the feedback system 60 to the ceramic disk 46 of FIG. 3 creates a servo which can automatically adjust the position of the collimating lens 44 with respect to the laser diode 42, if the light beam exiting the collimating lens 44 looses its collimation. In FIG. 8, all the elements, which are the same and serve the same purpose as the elements of FIG. 3, are designated by the same reference numerals.

The feedback system 60 comprises a beam splitter 62, a sensor 64, a controller block 66 and a power supply 68. The beam splitter 62 causes a portion of the light beam 43 from the collimator 44 to pass through and a portion 43' to be diverted onto the sensor 64. Sensor 64 can measure the amount of collimation. If the amount of collimation differs from a certain level, the sensor generates an error signal proportional to the collimation error. The sensor 64 is connected to the controller block 66 which controls the power supply 68. The power supply 68 generates the voltage $V_1$ which is applied to the ceramic disk 46.

Depending on the amount of collimation error, the control block 66 sends out a signal to the power supply to modify the output voltage of the power supply 68. The control block 66 continues to modify the voltage of the power supply until the position of the collimating lens 44 moves to a location where its output light beam becomes collimated. When the light beam becomes collimated, the sensor 64 stops sending out the error signal and the control block 66 stops modifying and freezes the output voltage of the power supply 68.

This fixed voltage will be applied to the Rainbow® disk 46 until the light beam exiting the collimating lens 44 again looses its collimation due to various reasons. The loss of collimation causes the control block 66 to modify the output voltage of the power supply 68. As a result, the collimating system of FIG. 8, provides a constant and precise collimated light beam.

It should be noted that a light beam exiting the collimating lens 44 can loose its collimation due to different factors such as diode temperature which can change the wavelength of the light beam or temperature change which can affect the collimating lens 44. However, regardless of the cause of collimation loss, the feedback system 60 can restore the collimation.

It should also be noted that any element which can change shape to displace the collimating lens 44 of this invention can replace the Rainbow® disk used in this invention.

It should further be noted that numerous changes in details of construction and the combination and arrangement of elements may be resorted to without departing from the true spirit and scope of the invention as hereinafter claimed.

What is claimed is:

1. A collimating system comprising:

a light source for emitting a light beam;

collimating means located on the path of the light beam from said light source for collimating the light beam;

holding means for holding said collimating means; and said holding means being so constructed and arranged to change shape to change the location of said collimating means, wherein said holding means is a Rainbow® disk.

2. The collimating system recited in claim 1 further comprises a voltage supplying means to cause said Rainbow® disk to change shape.

3. A collimating system comprising:

a light source for emitting a light beam;

collimating means located on the path of the light beam from said light source for collimating the light beam;

holding means for holding said collimating means;

said holding means being so constructed and arranged to change shape to change the location of said collimating means;

sensing means for receiving and determining if the light beam from the collimating means is collimated and generating an error signal if the light beam is not collimated;

voltage supplying means being electrically connected to said holding means for applying a voltage to said holding means for causing the holding means to change shape;

controlling means being electrically connected to said sensing means and said voltage supplying means; and said controlling means receiving said error signal from said sensing means and being responsive to said error signal for controlling the voltage of said voltage supplying means, wherein said holding means is a Rainbow® disk.

4. A raster scanning system comprising:

a light source for emitting a light beam;

collimating means located on the path of the light beam from said light source for collimating the light beam;

a medium;

scanning means located in the path of the light beam from said collimating means and being so constructed and arranged to scan the light beam from the collimating means across said medium;

holding means for holding said collimating means; and said holding means being so constructed and arranged to change shape to change the location of said collimating means, wherein said holding means is a Rainbow® disk.

5. The collimating system recited in claim 4 further comprises voltage supplying means for causing said Rainbow® disk to change shape.

6. A raster scanning system comprising:

a light source for emitting a light beam;

collimating means located on the path of the light beam from said light source for collimating the light beam;

a medium;

scanning means located in the path of the light beam from said collimating means and being so constructed and arranged to scan the light beam from the collimating means across said medium;

holding means for holding said collimating means;

said holding means being so constructed and arranged to change shape to change the location of said collimating means;

sensing means for receiving and determining if the light beam from the collimating means is collimated and generating an error signal if the light beam is not collimated;

voltage supplying means being electrically connected to said holding means for applying a voltage to said holding means for causing the holding means to change shape;

controlling means being electrically connected to said sensing means and said voltage supplying means; and said controlling means receiving said error signal from said sensing means and being responsive to said error signal for controlling the voltage of said voltage supplying means, wherein said holding means is a Rainbow® disk.

* * * * *